United States Patent [19]

Carreno

[11] 4,245,959
[45] Jan. 20, 1981

[54] WINDAGE NUT

[75] Inventor: Diether E. Carreno, Schenectady, N.Y.

[73] Assignee: General Electric Company, Schenectady, N.Y.

[21] Appl. No.: 959,508

[22] Filed: Nov. 13, 1978

[51] Int. Cl.³ .............................................. B21K 3/04
[52] U.S. Cl. ............................ 416/198 A; 416/201 R
[58] Field of Search ................ 416/193 A, 198 A, 201

[56] References Cited

U.S. PATENT DOCUMENTS

| 2,575,237 | 11/1951 | Sollinger et al. | 416/201 |
| 2,650,017 | 8/1953 | Pedersen et al. | 416/201 |
| 3,083,947 | 4/1963 | Horrocks | 416/198 A |
| 3,118,593 | 1/1964 | Robinson et al. | 416/198 A |
| 3,603,702 | 9/1971 | Jensen | 416/201 |
| 3,688,371 | 9/1972 | Koff | 416/201 |

FOREIGN PATENT DOCUMENTS 248893 1/1970 U.S.S.R. ..................................... 416/201

Primary Examiner—Everette A. Powell, Jr.
Assistant Examiner—A. N. Trausch, III
Attorney, Agent, or Firm—Jerome C. Squillaro

[57] ABSTRACT

An improved windage nut for fastening components of a gas turbine rotor assembly is disclosed. The outer portion of the nut has two lateral extensions for meeting with similarly shaped nuts adjacent to said nut to prevent rotation of the nut, and in combination with a plurality of similarly shaped nuts forms a ring shaped member having a smooth outer surface whereby friction and stresses are reduced during rotation of the rotor.

5 Claims, 5 Drawing Figures

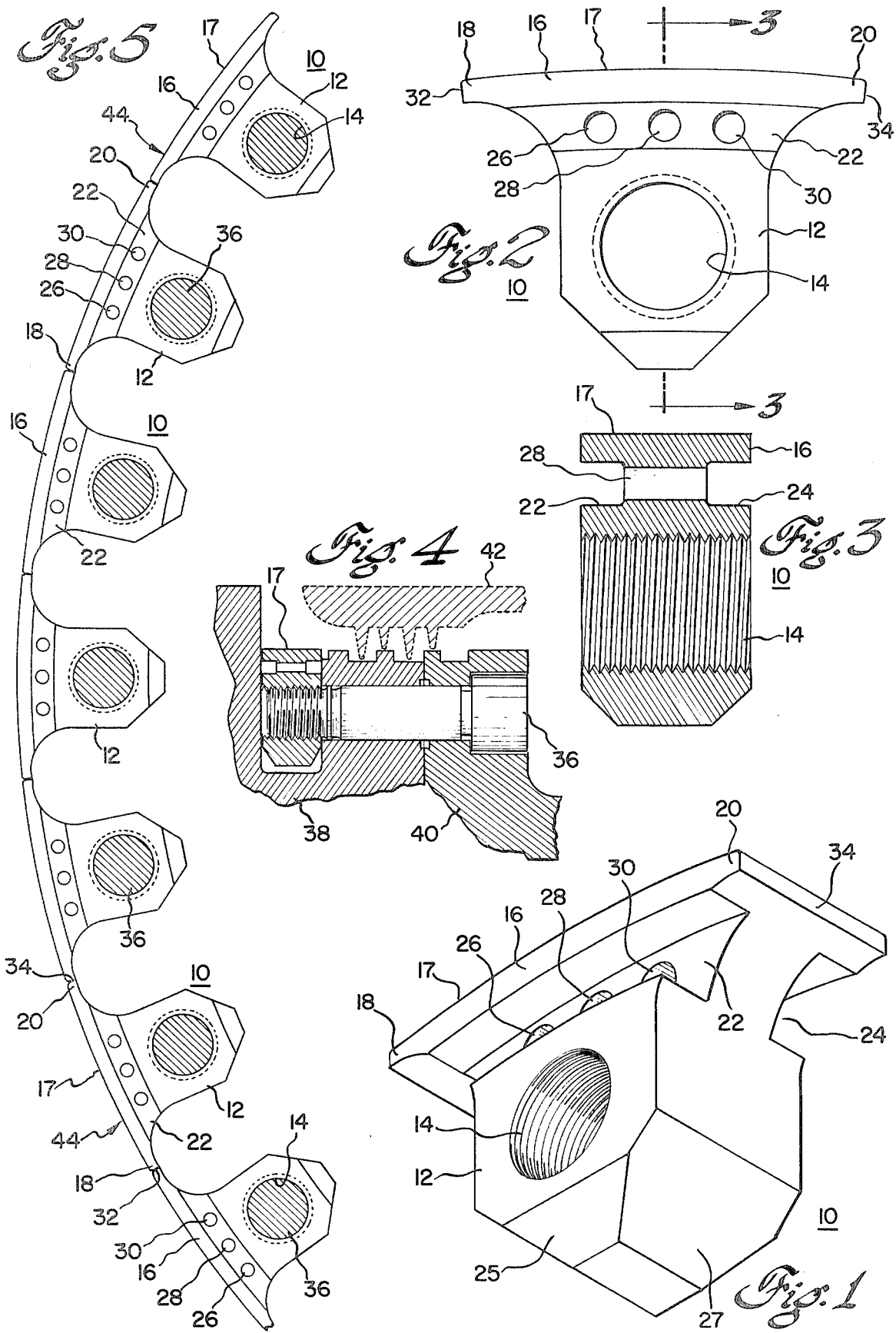

WINDAGE NUT

BACKGROUND OF THE INVENTION

This disclosure relates to a single shaft heavy duty turbine and more particularly to a bolting device for connecting components of a gas turbine rotor.

A brief description of a gas turbine plant is given in Van Nostrand's Scientific Encyclopedia, Fourth Edition, Van Nostrand Company, Princetown, N.J. Pages 757-759. The turbine is one of several components whose combined action is the conversion of heat energy into work. Typically, such a plant consists of a gas turbine, an air compressor driven by the gas turbine, and a combustion chamber wherein a liquid fuel is injected and burned at constant pressure equivalent to that of the compressor discharge. The rotor of the single shaft heavy duty turbine is a complex unit made up of a number of different components which are attached and secured to each other.

Heretofore, a plurality of nuts and bolts have been used in the rotor to connect the compressor section to the turbine section. However during rotation of the rotor under actual operating conditions, these nuts are exposed to high relative air velocities or "windage" which is the friction between the rotor and the air within its casing. The use of standard nuts, e.g. hexagonally shaped nuts, may cause sufficient rotational friction between the nut and the air passing over it to cause horsepower losses and result in multiple excitations to the last stage compressor blades and exit guide vanes due to pressure wakes being fed back into the compressor gas stream. As used herein, the term "windage nut" means a nut specially designed to minimize resistance of air against the contacting surfaces of the nut during rotation of the rotor by eliminating the outer protruding portions of the nut.

It is therefore an object of the present invention to provide an improved windage nut having low bolt stresses and having substantially no windage.

SUMMARY OF THE INVENTION

In accordance with my invention, I have discovered an improved windage nut for fastening components of a gas turbine rotor assembly. This nut is provided with an inner portion having a threaded hole which is capable of receiving a bolt, and with an outer portion having two lateral extensions shaped for meeting with other similarly shaped nuts located adjacent to said nut on either side thereof to prevent rotation of the nut during rotation of the rotor. The outer portion also has a smooth, curved contoured surface such that in combination with a plurality of similarly shaped nuts a ring or cylindrically shaped member is formed which reduces friction during rotation of the rotor. Furthermore, the inner portion of the nut has beveled surfaces for reducing parasitic weight of the nut.

BRIEF DESCRIPTION OF THE DRAWING

The invention is more clearly understood from the following description taken in conjunction with the accompanying drawing in which:

FIG. 1 is an isometric view of a windage nut of the present invention.

FIG. 2 is a side elevational view of the nut of FIG. 1.

FIG. 3 is a cross sectional view along cutting plane 3—3.

FIG. 4 is a fragmented cross sectional view of a portion of the gas turbine rotor showing a single windage nut and corresponding bolt in the securing position between the compressor and the gas turbine.

FIG. 5 is a partial front view of a plurality of windage nuts of the present invention located at the compressor section of the rotor.

Referring now to FIG. 1, the windage nut 10, for use in securing portions of a gas turbine rotor, has a body portion 12 through which a substantially centrally threaded aperture 14 is machined for receiving a corresponding bolt. The outer portion 16 of the body 12 has a convex, smooth shaped surface 17 and extends at either side to form lateral extensions 18 and 20. The body 12 is further provided with cross channel connections 22 and 24 to dampen any possibility of acoustical resonance through small lateral holes 26, 28 and 30 extending parallel to the threaded aperture 14. The inner portion of the body is designed to provide mechanical strength and to further minimize the parasitic weight of the windage nut 10 by having beveled surfaces 25 and 27.

FIG. 2 and FIG. 3 show a sideview and a cross section along the central axis of the windage nut 10 respectively. As shown the windage nut 10 is symmetrical along the plane 3—3 which when the nut is in position on the turbine, corresponds to a radial line going through the center of rotation of the turbine. The mass on the left side of the radial line 3—3 must be substantially equal to the mass on the right side. The cross channel connections 22 and 24 communicate through the lateral holes 26, 28 and 30. Lateral extensions 18 and 20 of the outer portion 16 terminate at locking ends 32 and 34.

As illustrated by FIG. 4 a corresponding bolt 36 is inserted into the windage nut 10 which secures or attaches the last stage of the compressor 38 to the extension shaft which connects to the turbine section 40. The passage of air in this connecting region is limited by damper 42, although during rotation of the rotor, a portion of the air flows over the outer surface of the windage nut 10. This flow of air should be as smooth as possible to avoid any agitation and thereby reduce or minimize the amount of surface friction which converts into horsepower losses (output loss of the gas turbine). Heat also produced by the surface friction can result in overheating and ultimately to failure of the securing device, i.e. the nut and bolt.

In FIG. 5 there are shown a plurality of windage nuts 10 which are secured to corresponding bolts 36. When the windage nuts 10 are secured in position on the rotor, their ends 32 and 34 meet to form a ring or circular shaped member 44 and the outer surface of each windage nut 10 being an arc of the member 44. Thus during actual rotation of the rotor, the air is permitted to flow over the smooth shaped surface 17 of each of the windage nuts 10 with a minimum of resistance or friction and thereby reducing the bolt stresses. Furthermore since the lateral extension 18 of each of the windage nuts 10 meet with the lateral extension 20 of an adjacent windage nut at the locking ends 32 and 34 respectively, it becomes readily apparent that all the nuts 10 are locked in place and prevented from rotation.

It will be appreciated that the invention is not limited to the specific details shown in the examples and illustrations and that various modifications may be made within the ordinary skill in the art without departing from the spirit and scope of the invention.

I claim:

1. An improved windage nut for fastening components of a gas turbine rotor assembly, said nut comprising a body provided with an inner portion having a threaded hole which is capable of receiving a bolt, and an outer portion having two lateral extensions shaped for meeting the other similarly shaped nuts located adjacent to said nut on either side thereof, whereby the lateral extensions of said nut and the adjacent nuts prevent rotation of said nuts, and said outer portion having a smooth curved contoured surface to form, in combination with a plurality of similarly shaped nuts, a ring-shaped member whereby friction during rotation of said rotor is reduced.

2. The windage nut of claim 1, wherein said nut is symmetrical about a center line passing radially there through.

3. The windage nut of claim 2, further comprising cross channel connections extending substantially parallel to the smooth curved contoured surface.

4. The windage nut of claim 3, further comprising a plurality of holes extending through and in a direction transverse to said connections.

5. The windage nut of claim 4, wherein the inner portion of said body is of a substantially square configuration with portions thereof opposite said outer portion having beveled surfaces for reducing the parasitic weight of said nut.

* * * * *